March 20, 1956 S. M. WAAS 2,738,720
KETTLE CONSTRUCTION FOR POPCORN MACHINES
Filed Jan. 15, 1951 3 Sheets-Sheet 1

INVENTOR.
Samuel M. Waas
BY
ATTORNEY

March 20, 1956     S. M. WAAS     2,738,720
KETTLE CONSTRUCTION FOR POPCORN MACHINES
Filed Jan. 15, 1951     3 Sheets-Sheet 2

INVENTOR.
Samuel M. Waas
BY
ATTORNEY.

March 20, 1956 S. M. WAAS 2,738,720
KETTLE CONSTRUCTION FOR POPCORN MACHINES
Filed Jan. 15, 1951 3 Sheets-Sheet 3
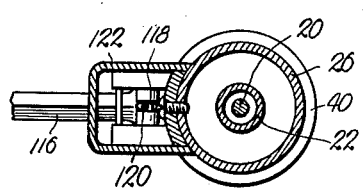
Fig. 5.
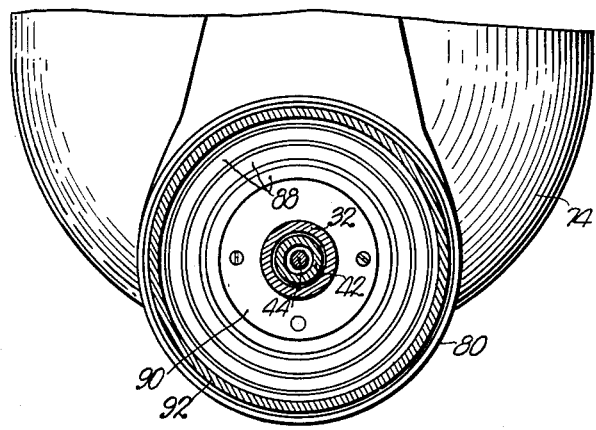
Fig. 6.
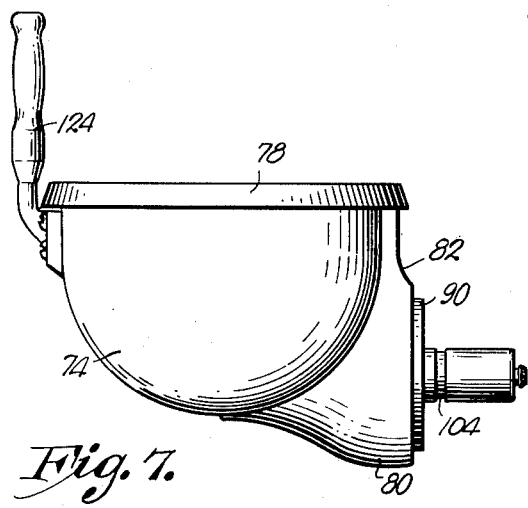
Fig. 7.
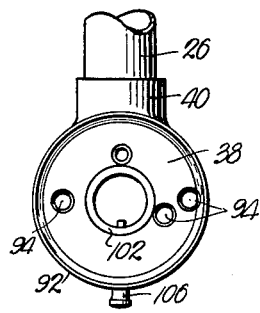
Fig. 8.
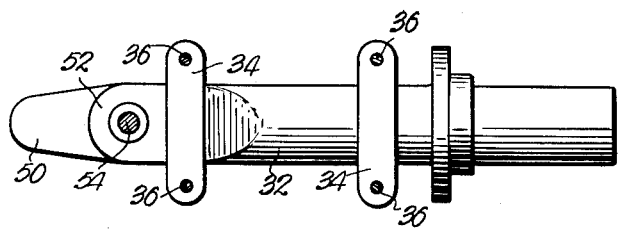
Fig. 9.
INVENTOR.
Samuel M. Waas
BY
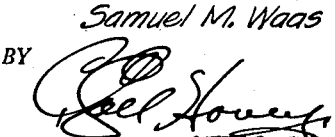
ATTORNEY.

United States Patent Office 2,738,720
Patented Mar. 20, 1956

2,738,720

KETTLE CONSTRUCTION FOR POPCORN MACHINES

Samuel M. Waas, Kansas City, Mo., assignor to Manley, Inc., Kansas City, Mo., a corporation of Missouri Application January 15, 1951, Serial No. 205,983

2 Claims. (Cl. 99—238.1)

This invention relates to improvements in popcorn machines and has to do specifically with a kettle arrangement designed to facilitate the entire popping operation, together with cleaning and maintenance and including a novel arrangement of parts to present a compact, neat-appearing and inexpensive overall assembly.

It is the most important object of the present invention to provide a kettle for popcorn machines mounted for swinging movement on a horizontal axis to permit easy dumping of the popped corn therefrom and having a drive arrangement for an agitator disposed within the kettle that is not only compact, neat appearing and arranged so as to not interfere with the work of the operator, but formed to permit complete removal of the kettle for cleaning and maintenance with a minimum of effort.

It is an important object of this invention to provide a popping kettle for popcorn machines that is mounted on an L-shaped support adapted to receive a train of operating shafts and gears to rotate the agitator of the kettle, there being means for disconnecting the two legs of the support and parts of the drive mechanism for the agitator so that the kettle may be cleaned or serviced as needed.

Another important object of this invention is to provide a popping kettle assembly mounted on a horizontal leg forming a part of a support, the leg being rotatable on its horizontal axis for swinging movement of the kettle to and from a dumping position separate from a swingably-mounted lid for the kettle. The primary object of this invention is to provide popcorn machine kettle assemblies of differing sizes, all interchangeable in a single unit to accommodate for varying demands, all with minimum effort and little time on the part of the operator.

Other objects of this invention include the way in which certain of the shafts are releasably interconnected to permit full removal of the popping kettle; the way in which the kettle and its supporting arm or leg are releasably mounted on a vertical support; and many other more minor objects including novel and important details of construction, all of which will be made clear or become apparent as the following specification progresses.

In the drawings:

Fig. 5 is a detailed, cross-sectional view taken on line V—V of Fig. 4.

Fig. 6 is a vertical section taken on line VI—VI of Fig. 4 looking in the direction of the arrows.

Fig. 7 is a side elevational view of the kettle per se showing the same entirely removed from its vertical support.

Fig. 8 is an elevational view of the lowermost end of the vertical support upon removal of the kettle therefrom.

Fig. 9 is a horizontal section taken on line IX—IX of Fig. 4 looking in the direction of the arrows.

Figures 1, 2:
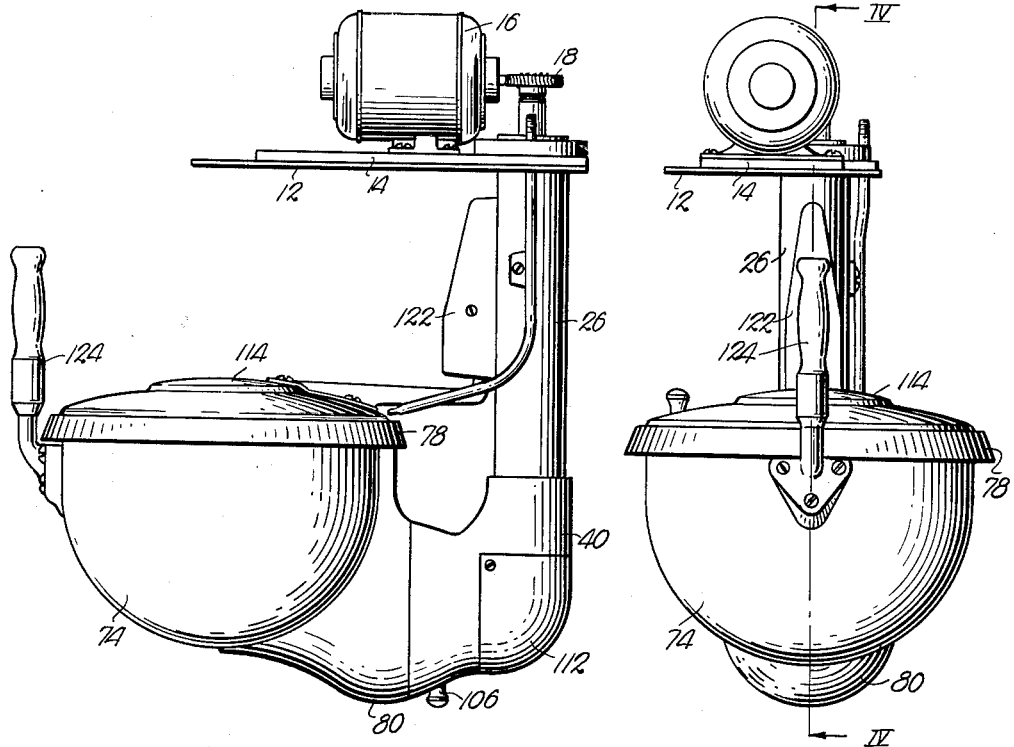
Figure 1 is a side elevational view of kettle construction for popcorn machines made pursuant to the present invention.
Figure 2 is an end elevational view thereof.

The entire assembly about to be described and forming the subject matter of this invention is adapted for mounting within any suitable cabinet and particularly that shown in my co-pending application for design Letters Patent filed on even date herewith and entitled "Popcorn Machine Cabinet." Such cabinet forms no part of the present invention and has therefore, not been illustrated, but it is contemplated that the same shall be provided with a hollow, transparent compartment having a top wall or ceiling.

It is upon such ceiling that a flat plate 12 is mounted with the kettle assembly illustrated in the drawings depending therefrom. Plate 12 in turn receives a base 14 for an electric motor or other prime mover 16, having a horizontal drive shaft provided with a worm, not shown, constantly in mesh with a gear 18 upon the uppermost end of an elongated vertical drive shaft 20. Shaft 20 is in turn housed within a vertical tube 22 that is in turn secured to a plug 24 closing the uppermost end of an outermost tube 26 that houses the tube 22. The tube 26 extends through the plate 12 and base 14 and is secured to the latter by means of screws 28 passing through an annular external flange on the tube 26. Tube 26 accordingly constitutes one leg of an L-shaped support for a hollow open-top kettle broadly designated by the numeral 30.

Kettle 30 is mounted directly upon the uppermost surface of an elongated arm 32 having its longitudinal axis horizontal and substantially perpendicular to the tubes 22 and 26 and the shaft 20.

The arm 32 is provided with a pair of spaced-apart, parallel integral bars 34 upon which the kettle 30 rests and is releasably secured thereto by means of a number of bolts 36. A body member 38 provided with a tubular portion 40 is secured directly to the tube 26 and supported thereby by means of the tube portion 40 circumscribing tube 26 and having any suitable means of releasable connection thereto.

The horizontal arm 32 is tubular and provided with a tubular housing 42 telescoped therewithin for a horizontal driven shaft 44. Pinions 46 and 48 normally intermeshed as shown in Fig. 4, are secured directly to the proximal ends of drive shaft 20 and driven shaft 44 respectively.

That end of the arm 32 opposite to pinions 46 and 48 is provided with a pair of spaced-apart fingers 50 and 52 for rotatably supporting a vertical spindle 54 that intersects the extended axis of shaft 44 in spaced parallelism to the shaft 20. Spindle 54 extends upwardly from the uppermost finger 52 through an opening 56 formed in base or bottom 58 of kettle 30. Constantly intermeshing pinions 60 and 62 are provided on shaft 44 and on spindle 54 respectively.

Figure 3:
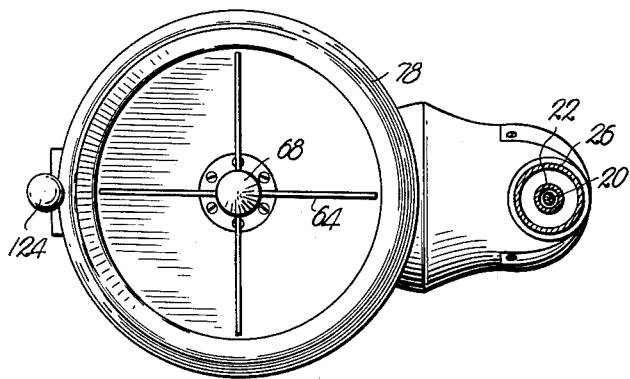
Fig. 3 is a substantially horizontal, cross-sectional view taken on irregular line III—III of Fig. 4 looking in the direction of the arrows.
Figure 10:
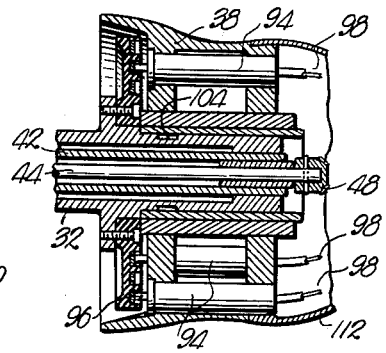
Fig. 10 is a fragmentary, detailed, cross-sectional view taken on line X—X of Fig. 4.
Figure 4:
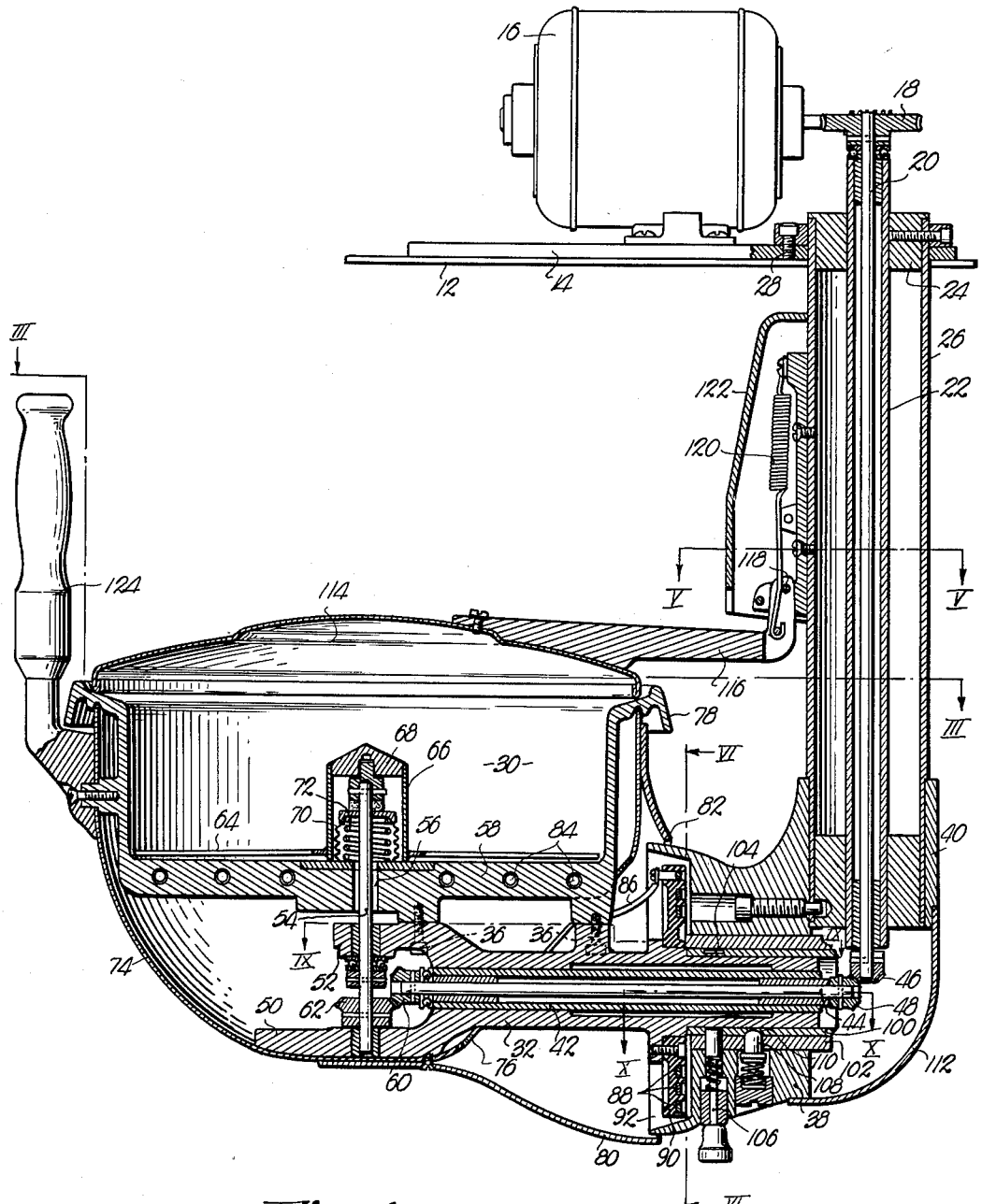
Fig. 4 is a vertical, substantially median sectional view taken on line IV—IV of Fig. 2 looking in the direction of the arrows.

A rotatable agitator 64 taking the form illustrated in Figs. 3 and 4, is provided within the kettle 30 adjacent the bottom 58 thereof, which agitator 64 includes an upstanding, hollow hub 66 that has a plug 68 closing the uppermost end thereof and secured directly to the uppermost end of spindle 54.

Opening 56 in bottom 58 is sealed by bellows 70, yieldably held expanded by spring 72 coiled about spindle 54. Kettle 30 is enclosed within an outermost shell 74 open at its top and having a clearance opening 76 for the arm 32. An annular overhanging flange 78 forming a part of the kettle 30 at its open top, circumscribes the uppermost edge of the shell 74. A second shell 80, secured to the shell 74 in covering relationship to the opening 76 has an opening 82 therein for receiving the proximal end of body 38 and for free rotation thereabout as will hereinafter become apparent.

An electric heating unit 84 embedded within the bottom 58 is provided with a thermostatic control not shown, the control and the unit 84 being electrically coupled through suitable wires, one of which is illustrated in Fig. 4 of the drawing and designated by the numeral 86, to a plurality of conducting rings 88.

Rings 88 are mounted in a plate 90 of non-conducting material circumscribing the arm 32 intermediate the ends thereof and secured rigidly thereto. Body 38 is provided with an annulus 92 that extends into the shell 80 through opening 82 in circumscribing relationship to the plate 90 and its conducting rings 88. The body 38 mounts a plurality of tubes 94 having a spring-loaded conducting plunger 96 for each ring 88 respectively and biased thereagainst.

The plungers 96 are coupled with a suitable source of electrical energy not shown by means of wires 98 passing upwardly through tube 26 and terminating above plate 12. A pair of relatively telescoped sleeves 100 and 102 are mounted on the arm 32 and within tubular body 38 respectively, sleeve 100 having an annular groove 104 therein adapted to slidably receive a spring-loaded plunger pin 106 carried by body 38. A relatively short, dome-shaped spring-loaded plunger 108 mounted in body 38 is normally seated within a small recess 110 in the sleeve 100. Pinions 46 and 48 are rendered accessible upon removal of a plate 112 joining portion 40 of body 38 and the latter adjacent the innermost end of arm 32.

The kettle 30 is provided with a lid 114 mounted upon an arm 116 that is in turn pivotally secured as at 118 to the tube 26. A spring 120 housed within a cover plate 122 has the uppermost end thereof secured to the tube 26 and its lower end pivotally secured to the arm 116.

The lid 114 is thus swingable toward and away from a position closing the open top of the kettle 30 and such swinging movement is rendered automatic through popped corn acting on the lid 114. However, such automatic feature and the precise operation of spring 120 are fully disclosed in my co-pending application, Serial No. 205,982 filed on even date herewith and entitled—"Lid Assembly for Popcorn Kettles," and forms no part of the present invention.

In normal operation, the kettle 30 is disposed as illustrated in Figs. 1, 2 and 4 of the drawings with the lid 114 closing the open top thereof. Unpopped corn is placed in the kettle 30, together with seasoning as desired and upon energization of the motor 16 the agitator 64 will be rotated within kettle 30. Obviously, the unit 84 is simultaneously energized to provide the necessary heat for popping of the corn. The agitator 64 is rotated from motor 16 through gear 18, shaft 20, pinions 46 and 48, shaft 44, pinions 60 and 62 and spindle 54 to hub 66.

Kettle 30 is held against tipping movement by the fact that plunger 108 is disposed within recess 110. As soon as corn in the kettle 30 pops and rises to a position opening lid 114, such corn will overflow into a collecting compartment within which the assembly hereof is disposed, and when it is desired to fully empty the kettle 30 of the popped corn, the operator merely grasps handle 124 secured to kettle 30 and moves the kettle 30 to a dumping position by rotating the arm 32. A force is applied to the arm 32, sleeve 100 rotates within sleeve 102 and the plunger 108 is forced out of recess 110.

The operation of the driven shaft 44 is in no way effected by such dumping of kettle 30 since the arm 32 freely rotates around and relative to the shaft 44 as sleeve 100 rotates in sleeve 102. Similarly, it is seen that the groove 104 provides for clearance for the spring 106 during the dumping action of kettle 30. It is therefore, not necessary to deenergize the motor 16 during the popping operations since the operator may freely swing kettle 30 on the horizontal axis of arm 32 to and from the normal upright position illustrated in Fig. 4 without interfering with continued rotation of spindle 54 and agitator 64.

Furthermore, it is noteworthy that by virtue of the fact that plate 90 is joined directly to arm 32 and plungers 96 are free to slide with respect to their corresponding rings 88, the unit 84 and its thermostatic control remain within the electrical circuit therefor during the dumping operation of kettle 30. When it is desired to remove kettle 30 from the vertical support 26, it is but necessary to swing the lid 114 upwardly clear of the kettle 30 and release pin 106 by pulling the same downwardly and clearing the innermost end thereof with respect to annular groove 104. The kettle 30 and arm 32, as well as all associated parts, including the plate 90 and shaft 44, can thereupon be shifted horizontally to the left, viewing Fig. 4, and to a position entirely removed from lid 114, body 38 and tube 26 in the manner illustrated in Fig. 7 of the drawings.

Replacement of the kettle 30 is simple, in that the operator merely slips the sleeve 100 into place within the sleeve 102, the beveled, innermost end of sleeve 100 forcing the pins 106 and 108 clear; and, as the arm 32 reaches the innermost end of its path of travel, with pinion 48 against and meshing with pinion 46, the pin 106 and the plunger 108 will snap into place within groove 104 and recess 110 respectively.

It is now seen that all of the aims and objects of this invention, as initially set forth herein, are fully accomplished by the provision of structure such as described above; and it is of particular significance that the unit is exceptionally attractive, compact, inexpensive and non-bulky from the standpoint of operator access and convenience in use thereof.

When it is desired to increase or decrease the capacity of a popcorn machine, the kettle 30 may be quickly and easily replaced with one of differing dimensions. If such change also necessitates changing of lid 114, the screws mounting the same to arm 116 can also be easily removed. Or, through use of a simple dove-tail interconnection between lid 114 and arm 116, the former can merely be slipped from arm 116 and be replaced with a lid of proper size.

A very important feature is the manner in which the agitator, as well as the heating element, remain in continuous operation during dumping of the popped corn from the kettle. Equally important is the simple removal of the kettle from its support, which removal may be accomplished by an operator of the machine unskilled in mechanical details and functions.

Obviously, the entire assembly may be varied in many respects within the spirit of the invention, and it is, therefore, desired to be limited only by the scope of the claims appended hereto.

Having thus described the invention what is claimed as new and desired to be secured by Letters Patent is:

1. In a popcorn machine having an L-shaped support including a tubular upright and a tubular body member having a horizontal bore, and a lid swingable on the upright, the combination of an open top kettle normally disposed beneath the lid and closed by the latter when the lid is swung to one end of its path of travel; a rotatable agitator in the kettle; a horizontal, tubular arm rigid to the kettle therebeneath and rotatable in said bore; relatively perpendicular shafts in the upright and in the arm respectively; gear means interconnecting the shafts when the arm is extended into the body member; mechanism operably interconnecting said agitator with the shaft in the arm, said mechanism including an agitator shaft parallel with the shaft in the upright, and gears interconnecting the agitator shaft and the shaft in said arm; structure holding the arm in the body member upon rotation of the kettle and the arm relative to the support and the lid, said structure including a releasable, radial plunger extending into said bore, and said arm being slidable in the bore for interchangeability of kettles upon removal of the arm and its shaft from the body member.

2. In a popcorn machine as set forth in claim 1 wherein said kettle is provided with an electric heating element; and conductive means coupled with the heating means and including a plate surrounding the arm, conductor rings mounted on the plate, and brushes carried by the body member in wiping engagement with the rings when the arm is in the body member.

References Cited in the file of this patent

UNITED STATES PATENTS

| | | |
|---|---|---|
| 1,566,924 | Robertson | Dec. 22, 1925 |
| 1,689,265 | Walker | Oct. 30, 1928 |
| 1,786,005 | Cretors | Dec. 23, 1930 |
| 1,799,136 | Robinson | Mar. 31, 1931 |
| 1,938,569 | Cretors | Dec. 12, 1933 |
| 2,134,682 | Burch | Nov. 1, 1938 |
| 2,248,812 | Cretors | July 8, 1941 |
| 2,310,349 | Bobo | Feb. 9, 1943 |
| 2,316,065 | Hapgood | Apr. 6, 1943 |